United States Patent [19]
Boughton et al.

[11] 3,930,712
[45] Jan. 6, 1976

[54] DUAL TURRET ATTACHMENT FOR A MICROSCOPE AND THE LIKE

[75] Inventors: Olin W. Boughton, Williamsville; Richard Schultz, Buffalo, both of N.Y.

[73] Assignee: American Optical Corporation, Southbridge, Mass.

[22] Filed: Nov. 20, 1972

[21] Appl. No.: 308,071

[52] U.S. Cl. .............................................. 350/87
[51] Int. Cl.² ...................................... G02B 21/08
[58] Field of Search .......................... 350/87–89, 350/15; 351/29

[56] References Cited
UNITED STATES PATENTS

| | | | |
|---|---|---|---|
| 1,995,599 | 3/1935 | Bauersfeld | 350/87 |
| 2,209,532 | 7/1940 | Michel | 350/87 X |
| 2,264,835 | 12/1941 | Flint | 350/87 |
| 2,266,797 | 12/1941 | Peck et al. | 351/29 |
| 2,427,689 | 9/1947 | Osterberg et al. | 350/87 X |
| 2,484,972 | 10/1949 | Turrettini | 350/87 X |
| 2,565,419 | 8/1951 | Aitcheson | 350/87 X |
| 2,977,848 | 4/1961 | Malfeld | 350/87 |
| 3,572,889 | 3/1971 | Bloomfield | 350/87 |

Primary Examiner—David H. Rubin
Attorney, Agent, or Firm—Alan H. Spencer; William C. Nealon

[57] ABSTRACT

A sub-stage, dual-turret assembly provides a rapid interchange of condensers and birefringent elements without sub-stage assembly, disturbance of illumination system, refocusing the microscope or dislocation of the object being studied and minimizes storage problems normally associated with maintaining convenient access to a selection of interchangeable delicate optical elements. The assembly has an upper turret normally adapted to carry at least two condensers and a lower turret usually adapted to carry a plurality of birefringent elements. The two turrets are independently rotatable in order to provide maximum versatility.

1 Claim, 8 Drawing Figures

DUAL TURRET ATTACHMENT FOR A MICROSCOPE AND THE LIKE

BACKGROUND OF THE INVENTION

This invention relates to microscopes employing optical elements which must be accurately aligned and having a plurality of readily interchangeable optical members which must also be individually and accurately located relative to a certain member or members in the optical system of the instrument. The invention is particularly useful in phase microscopy but could also be used advantageously in other forms of microscopy.

In the Osterberg et al. U.S. Pat. No. 2,427,689, issued Sept. 23, 1947, is shown and described a phase contrast microscope. The use of such an instrument for the examination of substantially transparent materials and objects, such as protozoa, bacteria, body tissues, blood, glass, plastics and the like, has considerably extended the boundaries of microscopy.

U.S. Pat. No. 2,565,419 to Aitcheson describes a turret assembly useful with the Osterberg et al. patent. Aitcheson teaches that a plurality of apertures may be mounted on a single sub-stage turret assembly to accommodate the lighting requirements of several different objectives with a single fixed condenser.

During the use of a phase microscope, it may be desirable to use any one of several different objectives of different powers. It will generally be desirable to interchange the aperture member in the condenser assembly so as to function to best advantage therewith. Also, it is usually desirable to interchange birefringent elements and it is frequently desirable to rapidly change from an air to oil immersion condenser as well as from one technique to another. However, regardless of the reasons for the changing of aperture, birefringent elements, or condensers, it has been found highly essential that proper exact predetermined spacing and alignment of each optical member of the sub-stage assembly to be used with the optical axis of the microscope be effected for best functioning of the microscope.

BRIEF DESCRIPTION OF THE INVENTION AND DRAWINGS

For the foregoing reasons, the invention provides a turret assembly of efficient, compact and sturdy construction which may be readily fitted in the limited space available beneath the stage of a microscope. The assembly comprises a body supporting two turrets, which are independently rotatable to selected positions. The upper turret is adapted to carry a plurality of condensers with irises and the lower turret is adapted to carry a plurality of birefringent elements.

DESCRIPTION OF THE PREFERRED EMBODIMENT

Figure 1:
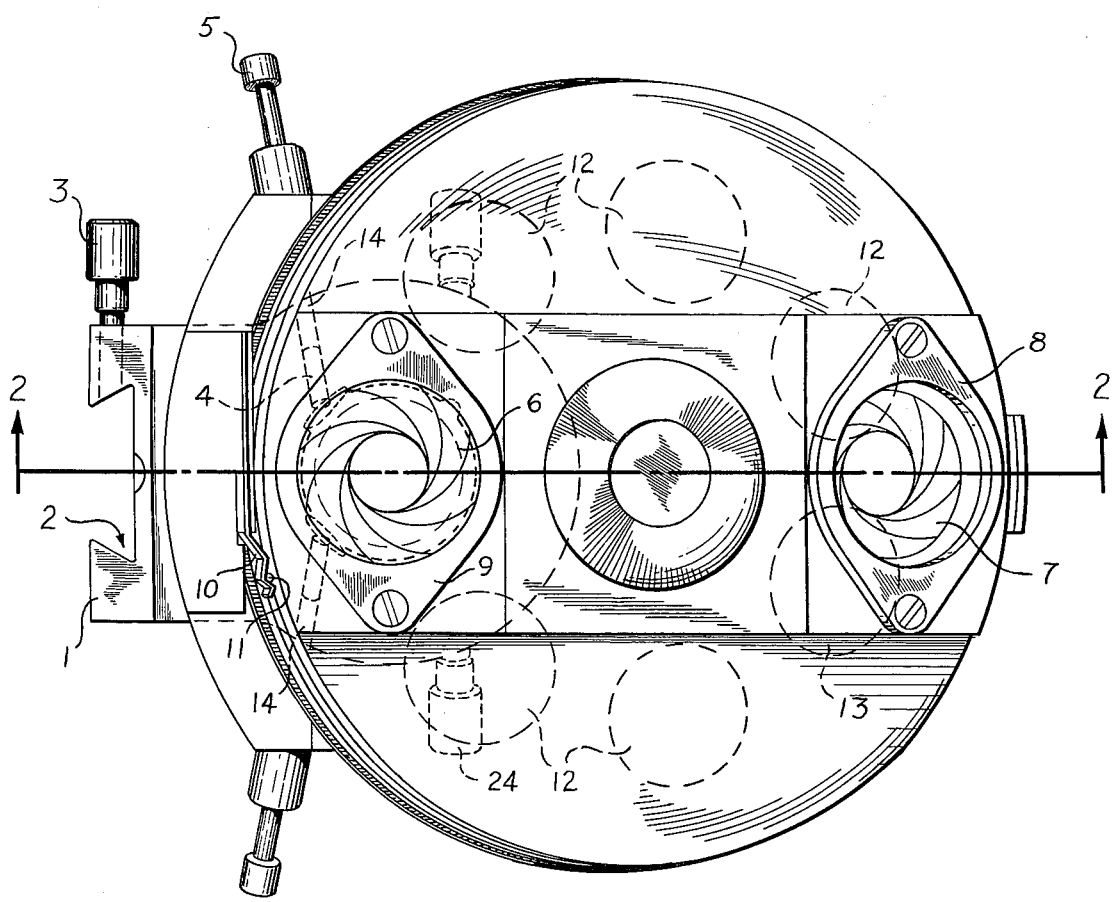
FIG. 1 is a top plan view of the dual-turret assembly but with the condenser removed.
Figure 3:
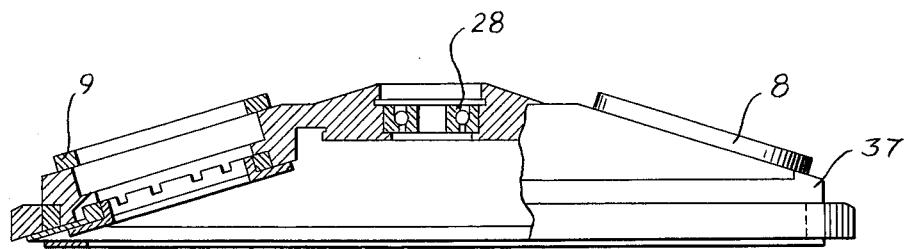
FIG. 3 is an elevational view of the upper turret assembly taken along lines 2—2 of FIG. 1.
Figure 4:
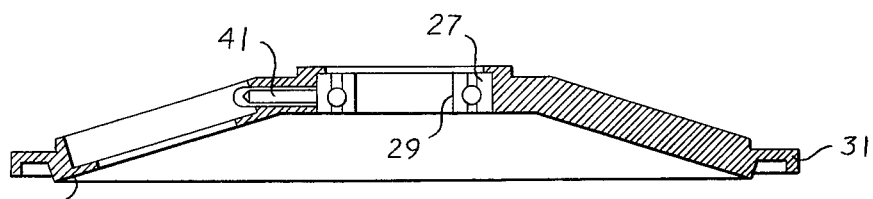
FIG. 4 is an elevational view of the lower turret assembly taken along lines 2—2 of FIG. 1.
Figure 5:
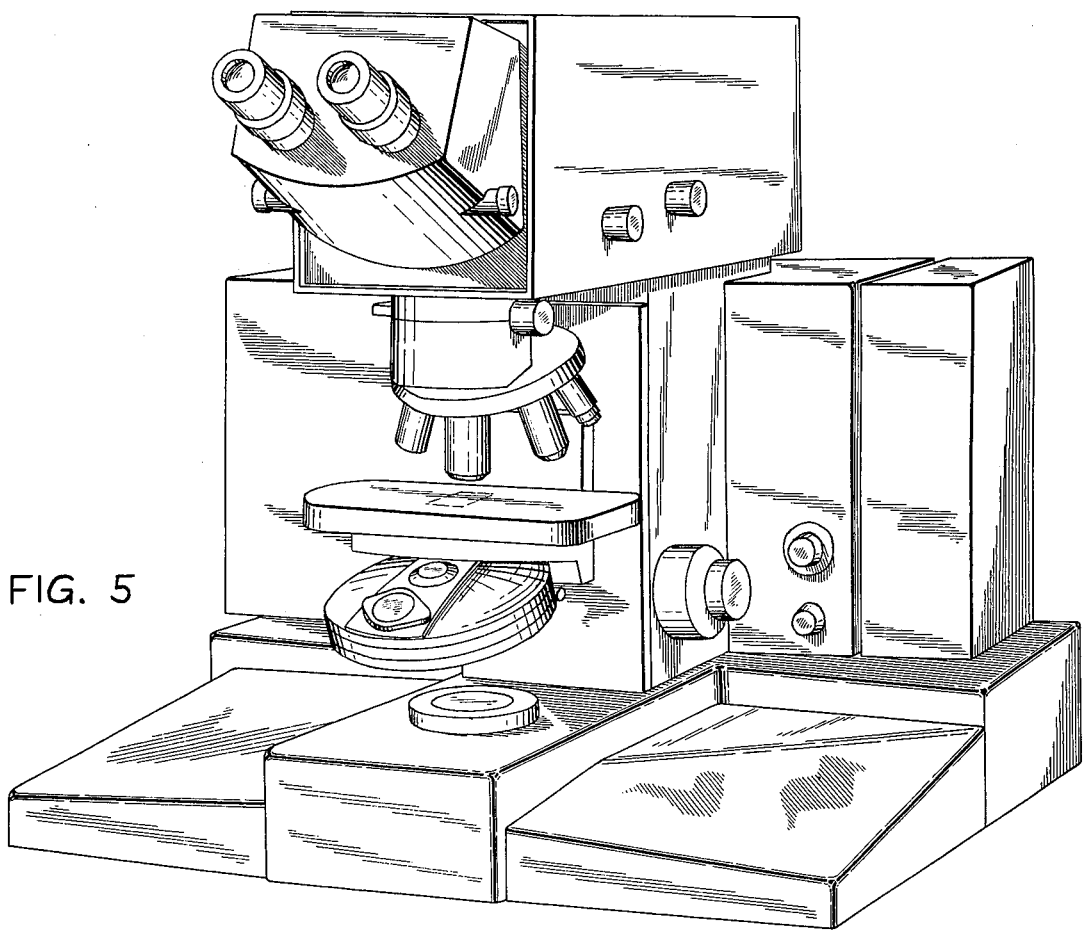
FIG. 5 is a perspective view of the assembly mounted on a microscope.

Referring to the drawings in detail, FIG. 1 shows mounting ring 1 having a dove-tail slot 2 with locking screw 3 for securing the turret assembly to a microscope base.

Figure 2:
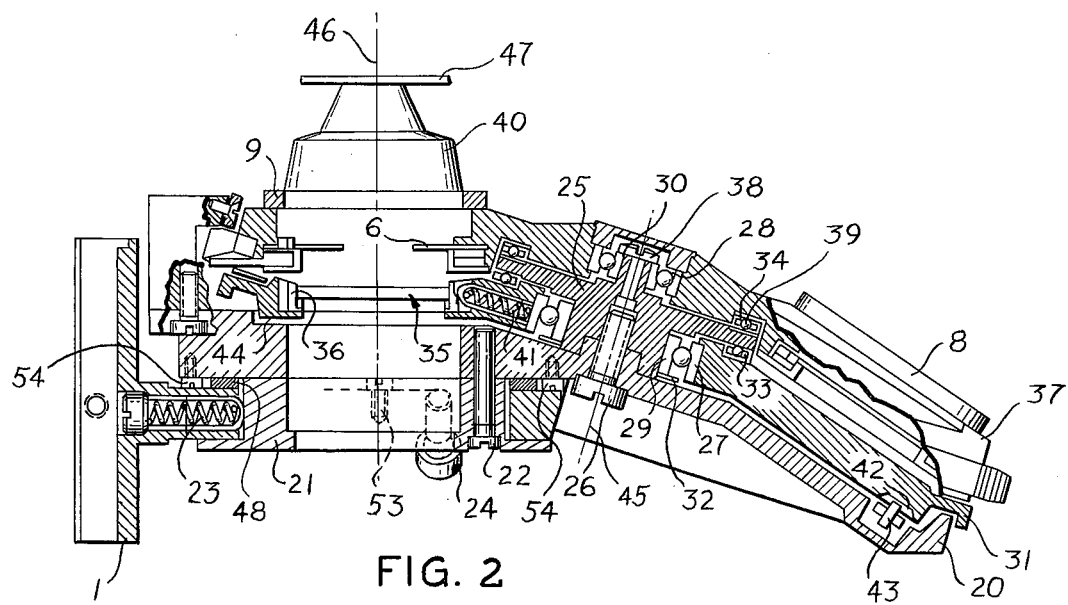
FIG. 2 is an elevational view of the assembly partly in section taken along lines 2—2 of FIG. 1.
Figure 6:
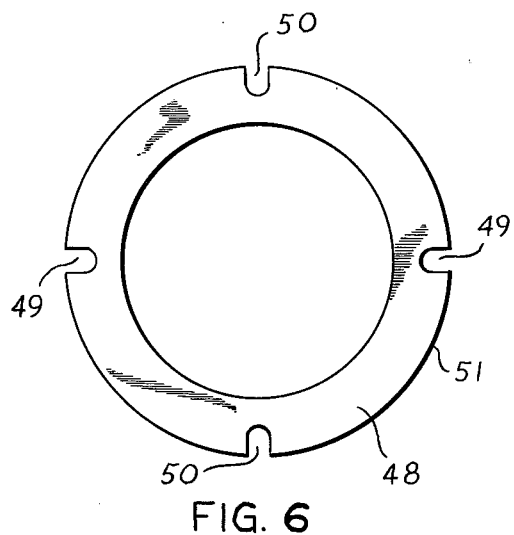
FIG. 6 is a top view of the annular member used to provide orthogonal adjustment for optical alignment.
Figure 7:
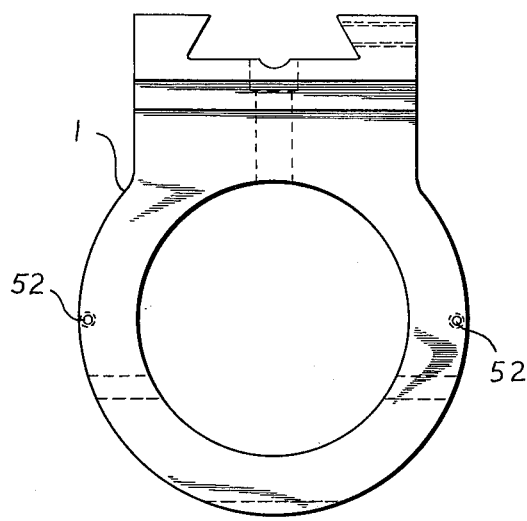
FIG. 7 shows a top view of the mounting ring.
Figure 8:
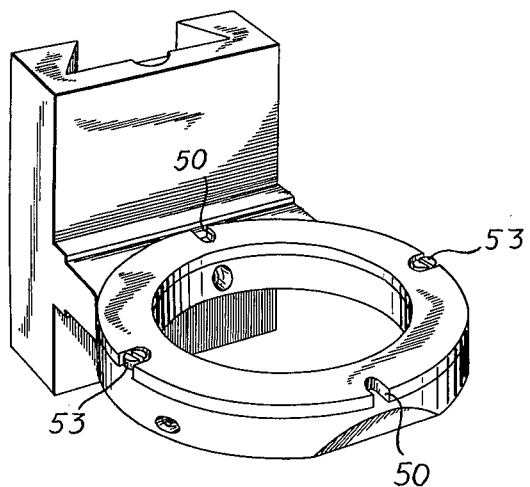
FIG. 8 is a perspective view of the mounting ring showing the annular member slidably positioned thereon.

As shown in FIG. 2, support member 20 is slidably connected to the mounting ring by flanged ring 21 and screws 22. Annular member 48, as shown in FIG. 6, has two diametrically opposed pairs of notches 49 and 50 in the outer periphery 51. FIG. 7 shows a top view of the mounting ring 1 with threaded holes 52 located therein. FIG. 8 shows annular member 48 slidably positioned on mounting ring 1 and generally located by screws 53. Notches 49 cooperate with screws 53 to permit limited lateral movement of the annular member with respect to the mounting ring. Support member 20 has a pair of screws 54, as shown in FIG. 2, located on the lower side thereof which cooperate with notches 50 in the annular member to permit limited lateral movement of the support member with respect to the annular member. This orthogonal system provides universal lateral adjustment for precise alignment of the turret assembly with respect to the optical axis of the microscope. Spring biased plungers 23 and positioning screws 24 are used to align the support member, which can be locked in position by final tightening of screws 22 if desired with the optical axis of the microscope. Bearing mount 25 is secured to the support member by screw 26 and has bearings 27 and 28 mounted on shoulders 29 and 30 respectively. Lower turret 31 is carried by bearing 27 and is maintained in proper alignment by pressure from thrust spring washer 32 urging the turret 31 against thrust bearing 33 which is carried on the flange of the bearing mount 25. The lower turret has a plurality of openings 12, shown generally in FIG. 1, an unobstructed opening 13 and birefringent element 35 carried by mount 36 in an opening. Each of the openings 12 is respectively adapted to hold a mounted birefringent element as shown. Upper turret 37 is carried by bearing 28 and maintained in alignment by screw 38 urging the turret through bearing 28 against thrust bearing 39. The upper turret has irises 6 and 7 located in openings therein and internally-threaded, centerable condenser mounts 8 and 9 carried above the respective irised openings. Condenser 40 is shown seated in condenser mount 9. Spring biased plunger 41 is carried in lower turret 31 and cooperates with positioning screws 4 also carried in the lower turret to center birefringent or aperture elements 35. The lower turret carries similar biased plungers and positioning screws (not shown) for locating respective birefringent elements (not shown) in each of openings 12. Wrenches 5 are carried by support member 20 and may by extended into holes 14 located in lower turret 31 to engage positioning screws 4 to align the birefringent or aperture element. Upper turret 37 carries protrusions 11 (only one shown), so located that, when they engage resilient indexing member 10 secured to the support member, a corresponding condenser will be properly aligned. The lower turret has a plurality of V-shaped notches 42 (only one shown) cooperating with biased roller 43 carried by the support member so located that a corresponding birefringent element is properly aligned with a condenser when the roller is engaged on a notch and both are aligned with the optical axis 46 of the instrument. When the carrier is rotated, the roller 43 will be forced downwardly by notch 42 and will roll along surface 44 of the lower turret until the next notch is reached. Engagement of the roller 43 with any of notches 42 will align a pair of adjustment screws 4 with extendable wrenches 5.

The turrets 31 and 37 are preferably rotatable about a common axis 45 which is oblique to optical axis 46. This arrangement permits exchange of one condenser for another by rotation of upper turret 37 without the necessity of lowering the turret assembly excessively to provide clearance for the state (not shown) supporting slide 47. Selection of the angle between the microscope optical axis 46 and axis of rotation can substantially eliminate the need to lower the turret assembly excessively, especially if the bottom of the microscope stage is grooved to provide clearance recesses for condenser movement in the arcs adjacent the optical axis.

I claim:

1. A sub-stage dual-turret attachment for a microscope comprising:

a body adapted to be removably mounted on the microscope frame, a first rotatable turret connected to said body, said first rotatable turret having a plurality of openings therein, at least one of said openings being adapted to releasably retain an optical element therein, said first rotatable turret being manually rotatable about an axis to bring any one of said openings into substantial alignment with the optical axis of the microscope, first indexing means engagable with said first rotatable turret for releasably retaining any one of said openings in substantial alignment with the optical axis of the microscope, manually operable means for adjusting said optical element laterally in any desired direction with respect to the optical axis of the microscope;

a second rotatable turret connected to said body, said second rotatable turret having two apertures defined by iris diaphrams therein, two condenser lens systems carried by said rotatable turret in respective optical alignment with said two apertures, said second rotatable turret being manually rotatable about an axis to bring any one of said condenser lens systems into substantial alignment with the optical axis of the microscope, second indexing means engagable with said second rotatable turret for releasably retaining any one of said apertures and corresponding condenser lens systems in substantial alignment with the optical axis of the microscope;

said first and second rotatable turrets have a common axis of rotation; and orthogonal adjustment means to provide lateral movement for alignment of said attachment with the optical axis of the microscope, said orthogonal adjustment means including a pair of spaced protrusions on said body, a ring member having a first pair of diametrically opposed recesses adapted to cooperate with said protrusions to slidably locate said ring, a second pair of diametrically opposed recesses in said ring spaced equidistant from said first pair of diametrically opposed recesses, and a support having a pair of protrusions adapted to cooperate with said second pair of recesses to slidably locate said support, said support carrying said first and second rotatable turrets and lock means to hold the attachment in a selected position to provide optical alignment.

* * * * *